US011743860B2

(12) United States Patent
He et al.

(10) Patent No.: US 11,743,860 B2
(45) Date of Patent: Aug. 29, 2023

(54) METHODS AND APPARATUS FOR PAGING RECEPTION IN WIRELESS COMMUNICATION

(71) Applicant: Apple Inc., Cupertino, CA (US)

(72) Inventors: Hong He, San Jose, CA (US); Dawei Zhang, Saratoga, CA (US); Haitong Sun, Cupertino, CA (US); Jie Cui, San Jose, CA (US); Manasa Raghavan, Sunnyvale, CA (US); Wei Zeng, Saratoga, CA (US); Yang Tang, San Jose, CA (US); Sigen Ye, Whitehouse Station, NJ (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 17/389,971

(22) Filed: Jul. 30, 2021

(65) Prior Publication Data

US 2022/0046581 A1 Feb. 10, 2022

Related U.S. Application Data

(60) Provisional application No. 63/062,376, filed on Aug. 6, 2020.

(51) Int. Cl.

| | |
|---|---|
| ***H04W 68/00*** | (2009.01) |
| ***H04W 76/10*** | (2018.01) |
| ***H04L 5/00*** | (2006.01) |
| ***H04W 56/00*** | (2009.01) |
| ***H04W 72/23*** | (2023.01) |

(52) U.S. Cl.
CPC ......... *H04W 68/005* (2013.01); *H04L 5/0051* (2013.01); *H04W 56/001* (2013.01); *H04W 72/23* (2023.01); *H04W 76/10* (2018.02)

(58) Field of Classification Search
CPC ... H04W 68/005; H04W 76/10; H04W 72/23; H04W 56/001; H04L 5/0051
USPC ........................................................ 370/329
See application file for complete search history.

(56) References Cited

U.S. PATENT DOCUMENTS

2014/0369326 A1* 12/2014 Wang ................ H04W 72/0446 370/336
2020/0196273 A1* 6/2020 Ozturk .................. H04W 76/30
2020/0329455 A1* 10/2020 Ryu ...................... H04W 68/02

* cited by examiner

*Primary Examiner* — Christopher R Crompton
(74) *Attorney, Agent, or Firm* — Sterne, Kessler, Goldstein & Fox P.L.L.C.

(57) ABSTRACT

An approach to communication by a user equipment (UE) in a wireless communication system that includes the UE sending an RRC setup request message including a paging offset value to a base station. The UE receives an RRC setup message from the network node, the RRC setup message including a PS-paging offset value and a PS-P-RNTI value associated with the UE. Energy conservation approaches for use with paging are described, including paging occasion monitor reporting and configuration, paging-offset reporting, the use of a paging monitoring skipping signal, and the use of dynamic TRS triggering for paging reception.

20 Claims, 10 Drawing Sheets

100
101
107
105
103
109

300

400

METHODS AND APPARATUS FOR PAGING RECEPTION IN WIRELESS COMMUNICATION

CROSS REFERENCE TO RELATED APPLICATIONS

This application claims the benefit of U.S. Provisional Application No. 63/062,376, filed Aug. 6, 2020 and entitled "Methods and Apparatus for Paging Reception in Wireless Communication," which is incorporated herein by reference in its entirety.

FIELD

Various aspects generally may relate to the field of wireless communications.

SUMMARY

An aspect is a method for communication by a user equipment with a network node in a wireless communication system. The method includes the step of sending an radio resource control (RRC) setup request message including a paging offset value to a network node, followed by receiving an RRC setup message from the network node, the RRC setup message including a PS-paging offset value and a PS-Paging-Radio Network Temporary Identifier (PS-P-RNTI) value associated with the user equipment (UE).

Another aspect is a user equipment (UE) for communicating with a network node in a wireless communication system. The UE includes a transmitter configured to transmit data to the network node, together with a receiver configured to receive data to the network node. The UE also includes processor circuitry that is configured to send an RRC setup request message including a paging offset value to a network node. The processor circuitry is also configured to receive an RRC setup message from the network node, the RRC setup message including a PS-paging offset value and a PS-P-RNTI value associated with the UE.

Another aspect is a network node for communicating with a user equipment (UE) in a wireless communication system. The network node includes a transmitter configured to transmit data to the UE, a receiver configured to receive data from the UE, and processor circuitry that is configured to receive an RRC setup request message including a paging offset value from the UE. The processor circuitry is also configured to send an RRC setup message to the UE, the RRC setup message including a PS-paging offset value and a PS-P-RNTI value associated with the UE.

Figure 1:
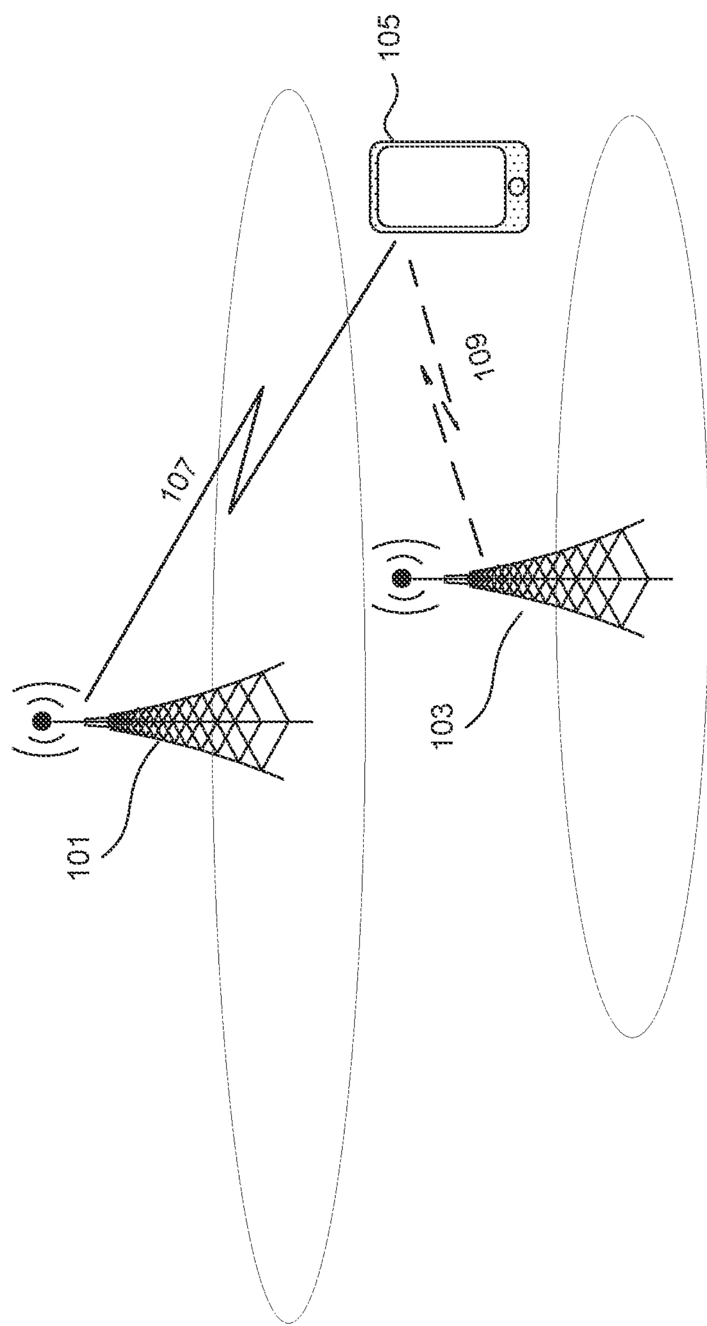
FIG. 1 illustrates an example system 100 implementing mechanisms for communications between an electronic device and a network, according to some aspects of the disclosure.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

The present disclosure will be described with reference to the accompanying drawings. In the drawings, like reference numbers indicate identical or functionally similar elements. Additionally, the left-most digit of a reference number identifies the drawing in which the reference number first appears.

The following Detailed Description refers to accompanying drawings to illustrate exemplary aspects consistent with the disclosure. References in the Detailed Description to "one exemplary aspect," "an exemplary aspect," "an example exemplary aspect," etc., indicate that the exemplary aspect described may include a particular feature, structure, or characteristic, but every exemplary aspect does not necessarily include the particular feature, structure, or characteristic. Moreover, such phrases do not necessarily refer to the same exemplary aspect. Further, when the disclosure describes a particular feature, structure, or characteristic in connection with an exemplary aspect, those skilled in the relevant arts will know how to affect such feature, structure, or characteristic in connection with other exemplary aspects, whether or not explicitly described.

The exemplary aspects described herein provide illustrative examples and are not limiting. Other exemplary aspects are possible, and modifications may be made to the exemplary aspects within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the aspects. Aspects may also be implemented as instructions stored on a machine-readable medium and read and executed by one or more processors. A machine-readable medium includes any mechanism for storing or transmitting information in a form readable by a machine (e.g., a computing device). For example, in some aspects a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the term "module" shall be understood to include at least one of software, firmware, and hardware (such as one or more circuit, microchip, or device, or any combination thereof), and any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary aspects will fully reveal the general nature of the disclosure so that others can, by applying knowledge of those skilled in relevant arts, readily modify and/or customize for various applications such exemplary aspects, without undue experimentation and without departing from the spirit and scope of the disclosure. Therefore, such modifications fall within the meaning and plurality of equivalents of the exemplary aspects based upon the teaching and guidance presented herein. Here, the phraseology or terminology serves the purpose of description, not limitation, such that the terminology or phraseology of the present specification should be interpreted by those skilled in relevant arts in light of the teachings herein.

FIG. 1 illustrates an example system 100 implementing mechanisms for communication between an electronic device and a network, according to some aspects of the disclosure. Example system 100 is provided for the purpose of illustration only and does not limit the disclosed aspects. System 100 may include, but is not limited to, network nodes (for example, base stations such as eNBs, and/or gNBs) 101 and 103 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. UE 105 can include, but is not limited to, as wireless communication devices, smart phones, laptops, desktops, tablets, personal assistants, monitors, televisions, wearable devices, Internet of Things (IoTs), vehicle's communication devices, and the like. Network nodes 101 and 103 (herein referred to as base stations) can include nodes configured to operate based on a wide variety of wireless communication techniques such as, but not limited to, techniques based on 3GPP standards.

According to some aspects, UE 105 is configured to communicate to base station 101 and/or the network associated with base station 101 (and/or 103). For example, before connecting to base station 101, UE 105 can search for a cell to attach. After completing the search, UE 105 can perform a Radio Resource Control (RRC) connection setup process. In one example, UE 105 can send an attach request to base station 101 and/or a mobility management entity (MME) (not shown) associated with base station 101. In some examples, the attach request can include an identifier of UE 105. In some aspects, if MME accepts the attach request, MME can send a setup request to, for example, base station 101. In some example, after receiving the setup request, and if base station 101 does not know the capabilities of UE 105, base station 101 can send a request to UE 105 to request the capabilities of UE 105. According to some aspects, UE 105 can send its capabilities to base station 101. In response, base station 101 can send an RRC connection reconfiguration message back to UE 105. Then UE 105 can start data communication using base station 101.

Figure 2:
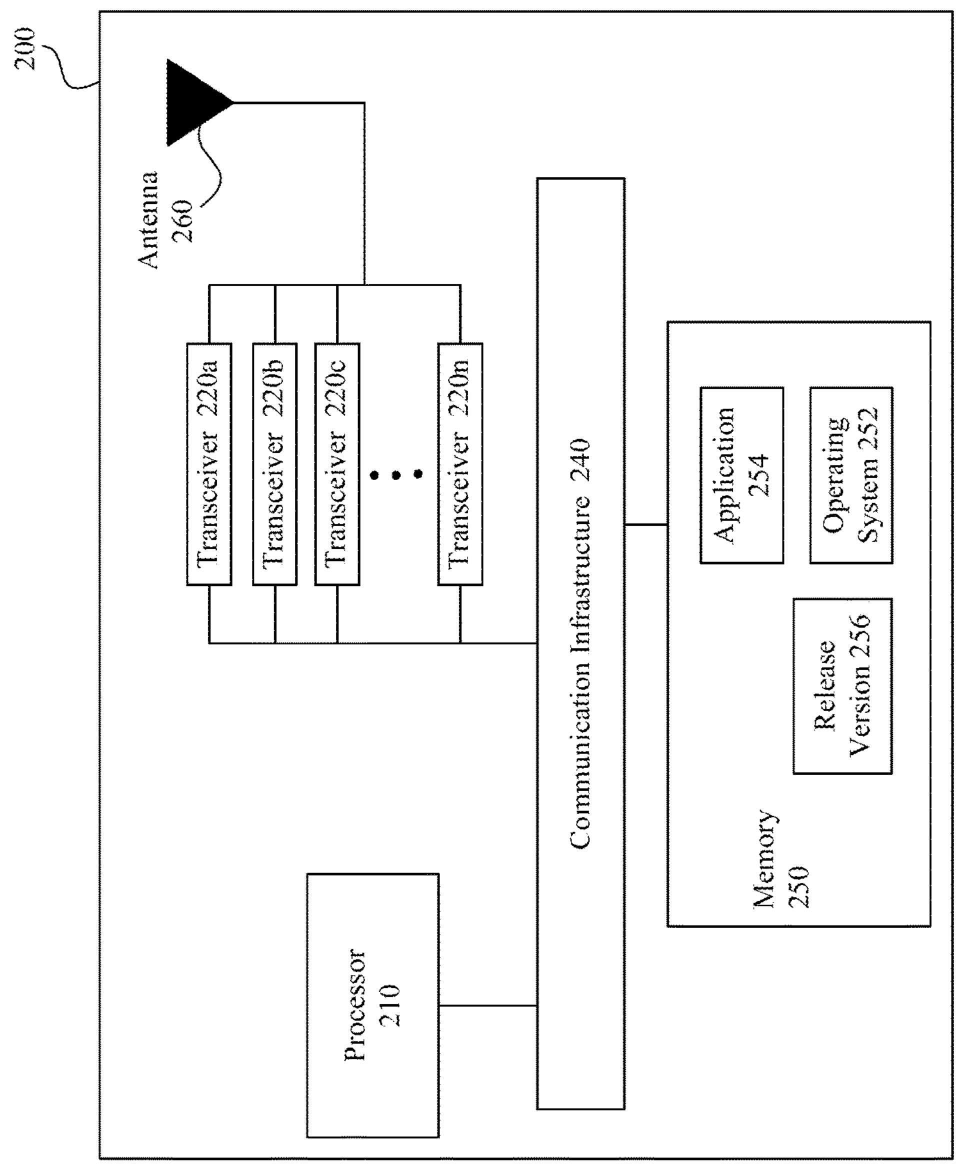
FIG. 2 illustrates a block diagram of an example system of an electronic device implementing communications, according to some aspects of the disclosure.

FIG. 2 illustrates a block diagram of an example system 200 of an electronic device implementing mechanisms for communications, according to some aspects of the disclosure. System 200 may be any of the electronic devices (e.g., base stations 101, 103, UE 105) of system 100. System 200 includes processor 210, one or more transceivers 220*a*-220*n*, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220*a*-220*n*. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220*a*-220*n*, and memory 250. In some implementations, communication infrastructure 240 may be a bus. Processor 210 together with instructions stored in memory 250 performs operations enabling system 200 of system 100 to implement mechanisms for communication, as described herein. Additionally, or alternatively, one or more transceivers 220*a*-220*n* perform operations enabling system 200 of system 100 to implement mechanisms for communication, as described herein.

One or more transceivers 220*a*-220*n* transmit and receive communications signals that support mechanisms for communications, according to some aspects, and may be coupled to antenna 260. Antenna 260 may include one or more antennas that may be the same or different types. One or more transceivers 220*a*-220*n* allow system 200 to communicate with other devices that may be wired and/or wireless. In some examples, one or more transceivers 220*a*-220*n* can include processors, controllers, radios, sockets, plugs, buffers, and like circuits/devices used for connecting to and communication on networks. According to some examples, one or more transceivers 220*a*-220*n* include one or more circuits to connect to and communicate on wired and/or wireless networks.

Additionally, one or more transceivers 220*a*-220*n* can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220*a*-220*n* can be configured to operate according to one or more of Rel-15, Rel-16, Rel-17, or later of 3GPP standard.

According to some aspects of this disclosure, processor 210, alone or in combination with computer instructions stored within memory 250, and/or one or more transceiver 220*a*-220*n*, implements the communication approaches as discussed herein. For example, transceiver 220*a* can enable connection(s) and communication over a first carrier (for example, carrier 107 of FIG. 1). In this example, transceiver 220*b* can enable detecting and/or measuring a second carrier (for example, carrier 109 of FIG. 1), transceiver 220*c* can enable detecting and/or measuring a third carrier, and transceiver 220*n* can enable detecting and/or measuring a fourth carrier, concurrently. As discussed above, the first, second, third, and fourth carriers can be associated to same or different base stations.

Additionally, or alternatively, wireless system 200 can include one transceiver configured to operate at different carriers. Processor 210 can be configured to control the one transceiver to switch between different carriers, according to some examples.

According to some aspects of this disclosure, processor 210, alone or in combination with computer instructions stored within memory 250, and/or one or more transceiver 220*a*-220*n*, implements mechanisms for communication, as described herein. Although the operations discussed herein are discussed with respect to processor 210, it is noted that processor 210, alone or in combination with computer instructions stored within memory 250, and/or one or more transceiver 220*a*-220*n*, can implement these operations. For example, processor 210 is configured to communicate with a base station (and/or a network associated with the base station) as a per-UE capability, during an initial communication discussed above (or any other initial access). Processor 210 can use a RRC layer signaling, a medium access control (MAC) layer, and/or a physical (PHY) layer signaling to communicate as a per-UE capability.

The global wireless standards body 3GPP continues to develop and standardize enhancements to wireless communications in support of various use cases that reflect an inexhaustible number and variety of wireless devices that seek to communicate massive amounts of data. Part of this development timeline includes 5G with its expected improvements for higher throughputs and capacity and lower latencies, as well as the ability to specify a flexible system that supports a wide variety of use cases with very different requirements (e.g., from low-end machine type communication (MTC) to the high-end virtual reality mobile broadband (MBB)).

User experience is an important contributor to 5G/NR success, not only in terms of data rates and latency to be experienced, but also the power consumption of the user equipment (UE). Given that 5G/NR devices have higher bandwidth and associated data rates, 5G/NR devices may dissipate more power than predecessor LTE devices. Reducing UE power consumption to improve the UE's battery life and ultimately make NR more power efficient is therefore important to the success of 5G/NR. In 3GPP Rel-16, several useful power saving schemes were specified, including power saving signal/DCI as enhancement to connected-mode Discontinuous Reception (cDRX), additional adaptations to maximum multiple input multiple output (MIMO) layer number, secondary cell (SCell) dormancy behavior and cross-slot scheduling as enhancements to bandwidth part (BWP) framework, radio resource management (RRM) relaxation as enhancements for idle/inactive-mode power consumption, and UE assistance information.

In RAN Plenary #86 meeting, one new work item of UE Power Saving Enhancement was approved for Rel-17 with following objectives: (a) specify enhancements for idle/inactive-mode UE power saving, considering system performance aspects (applicable to both RANI and RAN 2 working groups); (b) study and specify paging enhancement(s) to reduce unnecessary UE paging receptions, subject to no impact to legacy UEs (applicable to both RANI and RAN 2 working groups); and (c) specify means to provide potential TRS/CSI-RS occasion(s) that are currently available in connected mode to be made available to idle/inactive-mode UEs, while minimizing system overhead impact (applicable to RANI working group only). Different solutions are described below to address these objectives.

Figure 3:
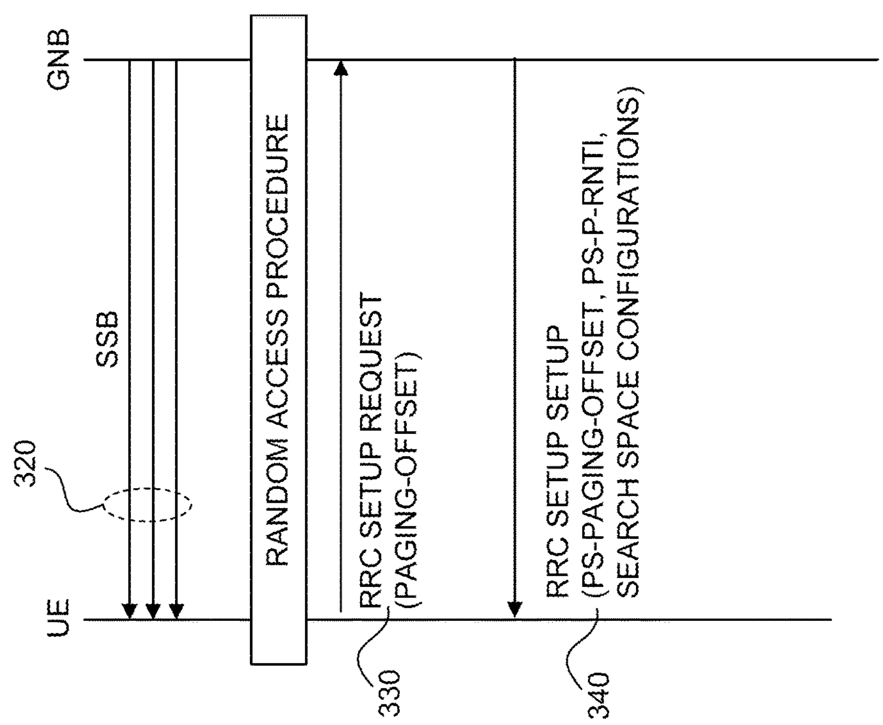
FIG. 3 illustrates a two-step procedure that may be used for paging reception, according to some aspects of the disclosure.

According to certain aspects of this disclosure, FIG. 3 illustrates a two-step procedure that may be used for paging reception. Prior to the two-step procedure, next generation Node B (gNB) sends to a UE one or more synchronization signal blocks (SSBs) 320. In this description, gNB is not tied to a particular 3GPP release, but refers to this base station (or network node) capability in any 3GPP release. In Step 1 of the two-step procedure, UE uses a random access procedure to send message 330 to gNB. Message 330 provides UE capability signaling or a radio resource control (RRC) Setup Request message. Within message 330, UE may report a paging-offset value, where the paging offset value represents the start of the search-time of DCI format X with CRC, as scrambled by PS-P-RNTI, relative to the start of the paging occasion (PO). Different alternatives can be considered to report the paging-offset value in message 330 as follows.

In one alternative, the paging offset value in message 330 may be indicated in units of milliseconds. In a second alternative, the paging offset value in message 330 may be indicated in units of slots. In a third alternative, the paging offset value in message 330 may be indicated in units of SSB periodicity. SSB periodicity may be known with reference to the following. A reference sub-carrier spacing (SCS) configuration may be provided in a system information block (SIB) e.g., in SIB1. In other embodiments, the SCS configuration of the SIB1 transmission is used as reference SCS.

Continuing to refer to FIG. 3, in Step 2 of the two-step procedure, message 340 is provided by gNB to UE. Message 340 provides a ps-paging-offset value that is used to configure the UE for PO monitoring in all of radio resource control (RRC) states in order to reduce UE power consumption. RRC states include, but are not limited to RRC_CONNECTED, RRC_IDLE and RRC_INACTIVE states. In addition, a corresponding search space configuration for UE may also be provided in message 340.

Typically, when the UE is in the idle or inactive modes, paging occasion (PO) monitoring accounts for a significant part of the UE power consumption. However, one problem for PO monitoring is that if the offset between the paging PDCCH and the corresponding PDSCH is not known, the UE has to remain awake until the PDCCH is decoded and the UE becomes aware that it is not being paged. The offset between the paging PDCCH and the corresponding PDSCH is referred to as the K0 value. In certain embodiments, to solve this energy consumption problem and to thereby improve UE power efficiency, the K0 value may also be provided to the UE as part of message 340.

A variety of different signaling approaches for providing the K0 value may be considered as follows. In a first approach, a set of table values may be predefined in a specification for different use cases, e.g., for different frequency ranges (FR). With these sets of table values already defined in the specification, one of these tables may be signaled (or indicated) in message 340 for paging PDSCH scheduling purposes.

In a second approach, a set of time-domain resource allocations, including the K0 value, may be provided in System Information Block 1 (SIB1) and used for paging PDSCH scheduling.

Figure 4:
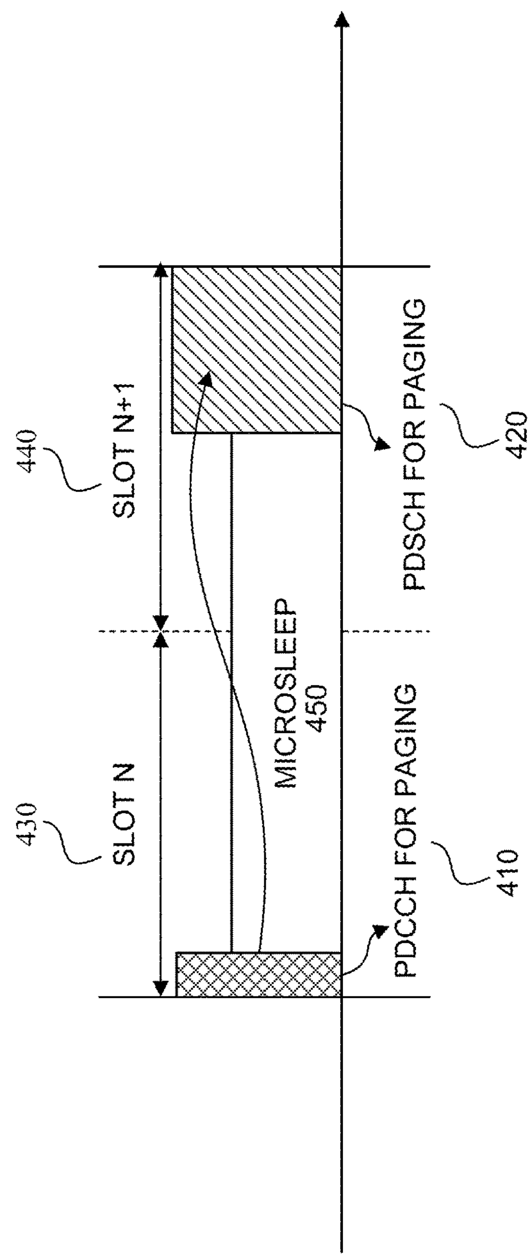
FIG. 4 illustrates an example of cross-slot scheduling for paging physical downlink shared channel (PDSCH) transmission to save UE power, in accordance with some aspects of this disclosure.

In both of these above two approaches, an indication may be provided to the UE as to whether K0>0 i.e., cross-slot scheduling is used for paging PDSCH transmission if there is at least a time domain resource allocation (TDRA) configuration with K0=0 in accordance to the above first approach or second approach. The benefits of these approaches are that they allow the UE to know in advance whether the UE can go into light/micro-sleep after paging PDCCH reception, until it becomes aware whether it should decode the associated PDSCH or not. FIG. 4 illustrates an example of cross-slot scheduling for paging PDSCH transmission to save UE power. In FIG. 4, two consecutive slots are shown, slot N (430) followed by slot N+1 (440). In FIG. 4, K0 is greater than 0, as the PDCCH for paging (410) occurs in slot N (430), while PDSCH for paging (420) occurs in the next slot, slot N+1 (440). With an indication that K0 is greater than 0, the UE can go into a micro-sleep in the interval (450) between PDCCH for paging (410) in slot N (430) and PDSCH for paging (420) in slot N+1 (440).

Continuing to refer to FIG. 3, in accordance with this present disclosure, the 5G shortened temporary mobile subscriber identity (5G-S-TMSI) may be also included in message 340. As noted above, message 340 in certain embodiments may be the RRC SetupRequest message. In these embodiments, the 5G-S-TMSI is used to determine the Paging Monitoring Occasion.

According to certain aspects of this disclosure, various approaches may be considered for a paging-offset value report at the UE side. In certain embodiments, the paging-offset value at least depends on the number of synchronization signal blocks (SSBs) that the UE needs to process in order to maintain the time and frequency synchronization for paging PDSCH decoding. To facilitate such reporting by the UE, a set of offset values may be tabulated, where the offset values are associated with different SSB-based SS-received signal received power (RSRP) thresholds. An exemplary embodiment of such a table is shown below in Table 1.

TABLE 1

Mapping Between Measured SS-RSRP and POR Reporting

| Index | SS-RSRP | Paging-Offset |
|---|---|---|
| 0 | <= Threshold_1 | X(0) |
| 1 | Threshold_1<SS-RSRP<= Threshold_2 | X(1) |
| . . . | . . . | . . . |
| K − 1 | Threshold_K − 1<SS-RSRP<= Threshold_K | X(K − 1) |

In these embodiments, it should be noted that different UEs may report different paging offset values even for a same SS-RSRP value. This is simply due to different receiver algorithms in the different UEs, which may result in the need for different SSBs to meet certain synchronization requirements.

Figure 5:
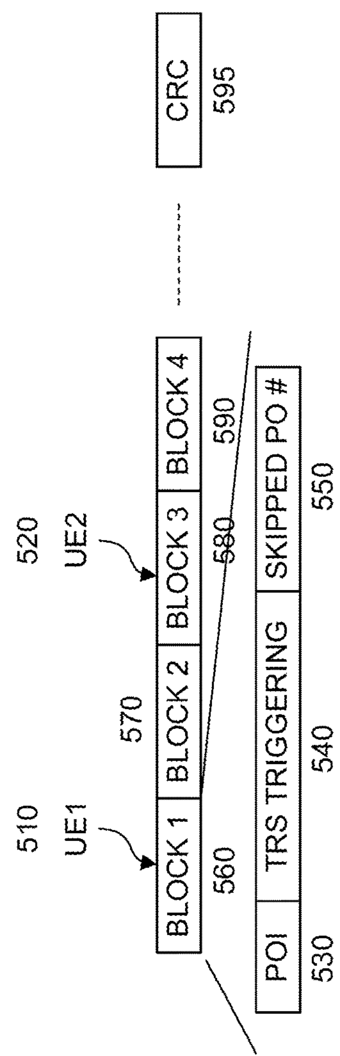
FIG. 5 illustrates an embodiment of downlink control information (DCI) Format X for providing a paging monitoring indication, according to aspects of the disclosure.

According to certain embodiments of this disclosure, a new DCI format, hereinafter referred to as "DCI Format X," may be introduced and used for notifying the power saving information outside DRX Active Time for one or more UEs in the RRC_IDLE, RRC_INACTIVE and RRC_CONNECTED states. FIG. 5 illustrates an embodiment of DCI Format X for providing a paging monitoring indication. Referring to FIG. 5, the following information may be transmitted to the UE: block number 1 (560), block number 2 (570), block number 3 (580), block number 4 (590), . . . , block number N, followed by CRC 595, as scrambled by PS-P-RNTI. The starting position of a particular block is determined by the parameter PSPosition-DCIX, as provided by higher layers for the particular UE configured with the particular block. Thus, if the UE is configured with higher layer parameter PS-P-RNTI and DCI-FormatX, one block is configured for the UE by higher layers. In FIG. 5, block 1 (560) is associated with UE1 (510), and block 3 (580) is associated with UE2 (520). As shown in FIG. 5, block number 1 (560) (which is associated with UE1 (510)) may include one or more of the following fields:

- Power-On Indication (POI) (530), which in an embodiment may be one (1) bit;
- Aperiodic Channel State Information-Reference Signal (CSI-RS) for tracking reference signal (TRS) trigger purposes (540). In an embodiment, the TRS resource sets for this purpose may be configured and signaled to UE in message 340, as illustrated in FIG. 3. One state should allow a "NOT trigger TRS transmission" state in order to provide flexibility for gNB to control the signaling overhead. In some embodiments, aperiodic TRS is triggered only in case when power-on indictor is set to be '1' i.e., UE is requested to monitor PO PDCCH for paging reception.
- The number of skipped DRX cycles for paging monitoring (550). In certain embodiments, the number of skipped DRX cycles may be in the range 5 to 10.
- The aggregation-level of control channel elements (CCEs) for PO PDCCH that is used to schedule Paging PDSCH.

Figure 6:
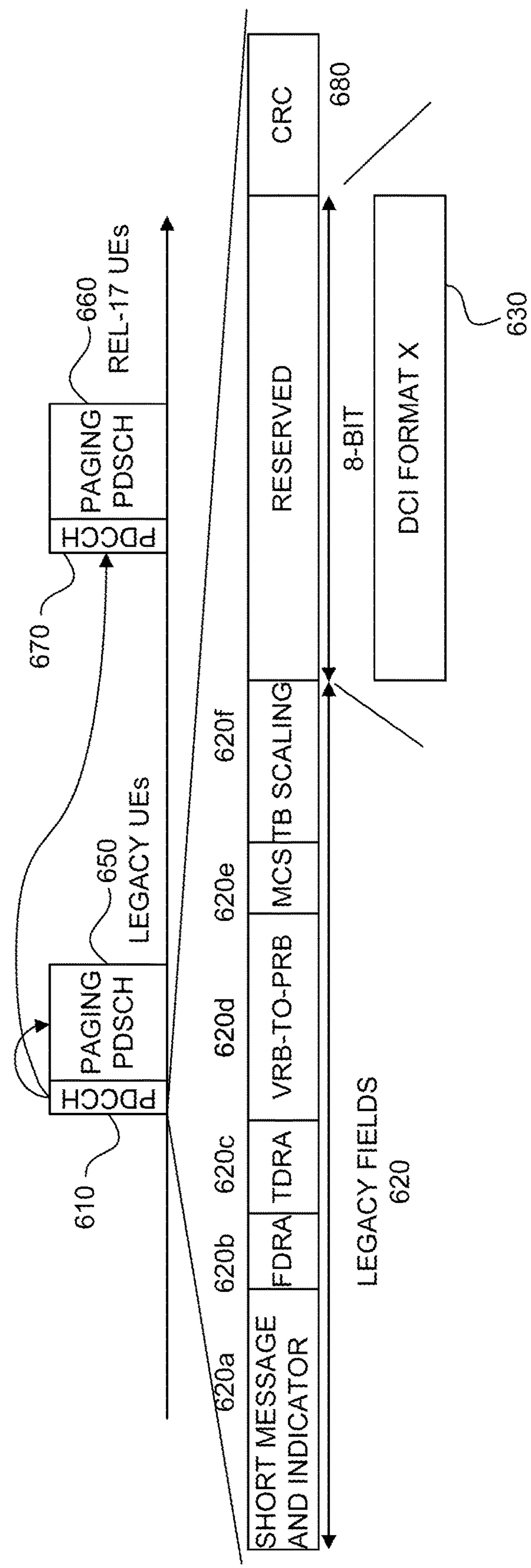
FIG. 6 illustrates a DCI format design that multiplexes legacy paging format and DCI format X into one physical downlink control channel (PDCCH) transmission, according to aspects of the disclosure.

FIG. 6 illustrates a DCI format design that multiplexes legacy paging format and DCI format X into one PDCCH transmission. In FIG. 6, PDCCH 610 and PDCCH 670 are shown. Paging PDSCH 650 for legacy UEs and Paging PDSCH 660 for Release 17 (and subsequent) UEs are also illustrated. DCI Format 640 in PDCCH 610 includes legacy fields 620, DCI format X 630 (using the reserved bits from the legacy format), and a CRC field 680. Legacy fields 620 include short message and indicator 620*a*, DRA 620*b*, TDRA 620*c*, VRB-to-PRB 620*d*, MCS 620*e*, TB scaling fields 620*f*, as illustrated in FIG. 6.

In some embodiments, the DCI Format X size may be either fixed in a relevant specification, or the DCI Format X size is aligned with one of the legacy DCI Formats. In an exemplary embodiment, the DCI Format X size may be aligned with legacy DCI Format 1_0. In this example, note that alignment with DCI Format 1_0 is beneficial to minimize the signaling overhead by sharing one DCI Format 640 with legacy UEs for PO PDCCH monitoring purpose, as illustrated in FIG. 6 using separate fields 620 and 630. Referring to FIG. 6, legacy UEs shall monitor DCI Format 640 as in legacy to receive paging PDSCH transmission 650. For Rel-17 UEs, the embedded DCI Format X 630 by re-purposing the reserved field in DCI 640 shall be monitored and used to determine whether or not to monitor PDCCH 670 and corresponding PDSCH 660 for paging reception.

A UE in RRC-connected mode is expected to receive the higher layer UE specific configuration of a NZP-CSI-RS-ResourceSet configured with higher layer parameter, trs-Info. Note that these configured TRS resource sets should be stored and used after entering RRC_IDLE or RRC_INACTIVE state unless cell-re-selection occurs or explicitly requested in the RRCRelease message. Certain embodiments of the present disclosure may support aperiodic TRS transmission before an idle mode DRX paging occasion.

In some embodiments, the triggering DCI Format X may comprise at least one field to indicate a transmission timing parameter associated with the triggered TRS. Various signaling solutions can be considered to achieve this purpose.

In a first solution (solution 1), the periodicity in slots and slot offset are jointly obtained from the higher-layer parameter. There are two possible approaches to the first solution, In solution 1-1, the first TRS transmission occasion configured by higher layers that starts no earlier than a processing delay (T_(pros,x)) after the last symbol of triggering PDCCH transmission is triggered for reception, where T_(pros,x) may be fixed in a specification, e.g., based on reference SCS. Alternatively, in solution 1-2, the triggered TRS resource may be included in the TRS resource configuration that starts later than T_(pros,x) symbols. This is beneficial to allow different UEs to utilize different TRS resources for time-frequency tracking and hence minimize power consumptions.

Figure 7:
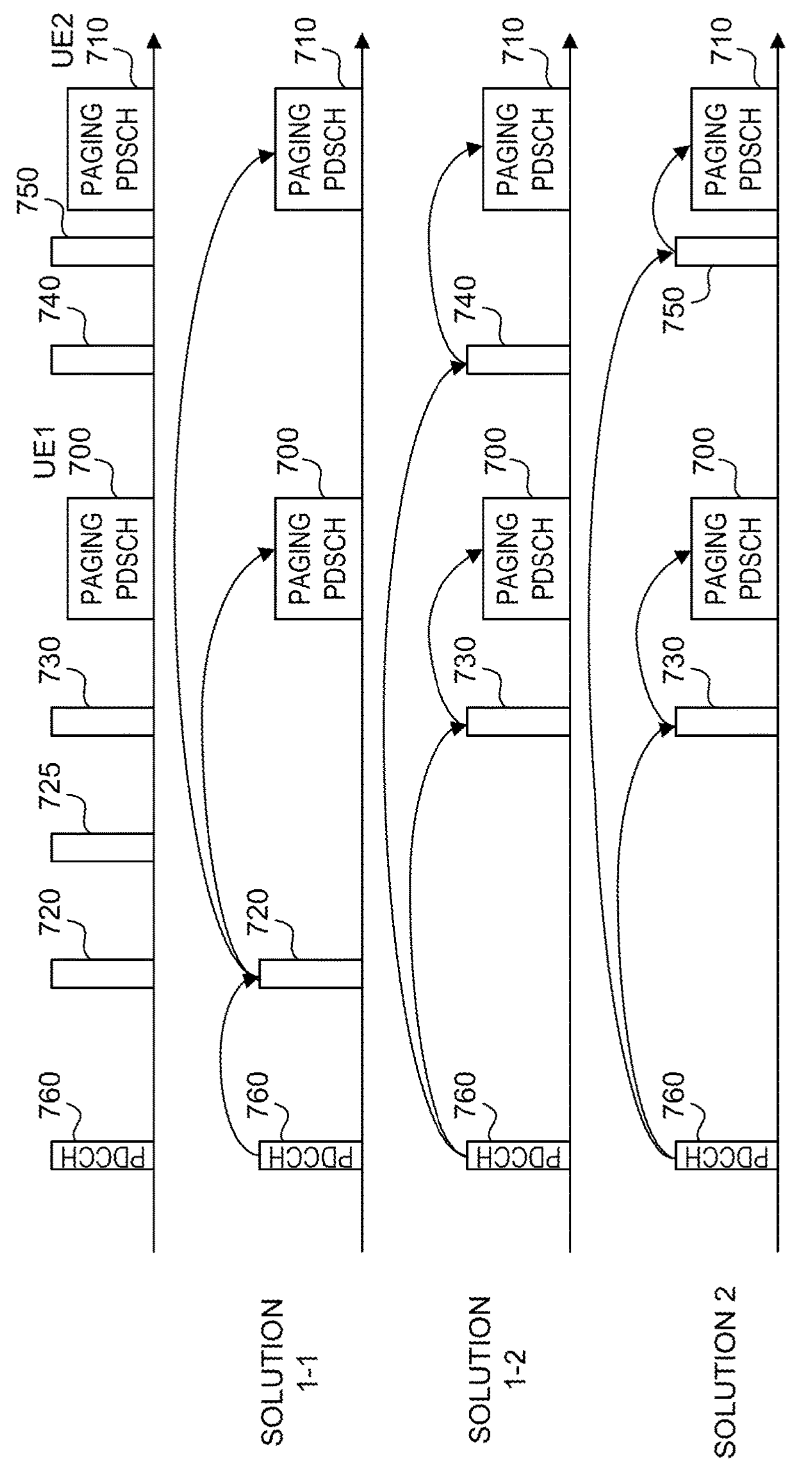
FIG. 7 illustrates an example of tracking reference signal (TRS) transmission triggering in accordance with three solutions, according to aspects of the disclosure.

In a second solution (solution 2), the TRS resource in time domain is defined relative to the first symbol of associated PO monitoring PDCCH location FIG. 7 illustrates an example of TRS transmission triggering in accordance with solution 1-1, solution 1-2 and solution 2. Referring to FIG. 7, the TRS resource 720 may be triggered by DCI Format in PDCCH 760 assuming it meets the T_(pros,x) gap requirement, which is shared by paging PDSCH reception 700 for UE1 and paging PDSCH 710 for UE2.

Solution 1-2 may further reduce UE power consumption by leveraging separate TRS transmissions 730 and 740 for different UEs. i.e., UE1 700 and UE2 710 that are closest to the respective paging transmission. Note that, solution 1-2 can achieve the same benefit as solution 2 and additionally allows sharing a single TRS resource among multiple UEs, i.e., a fallback to solution 1-1 to reduce TRS overhead.

Solution 1-3 provides the best power saving gain by utilizing the latest TRS resource 730 and 750 that is most close to paging PDSCH transmission 700 and 710 at the cost of increased TRS overhead, compared to solution 1-1

Figure 8:
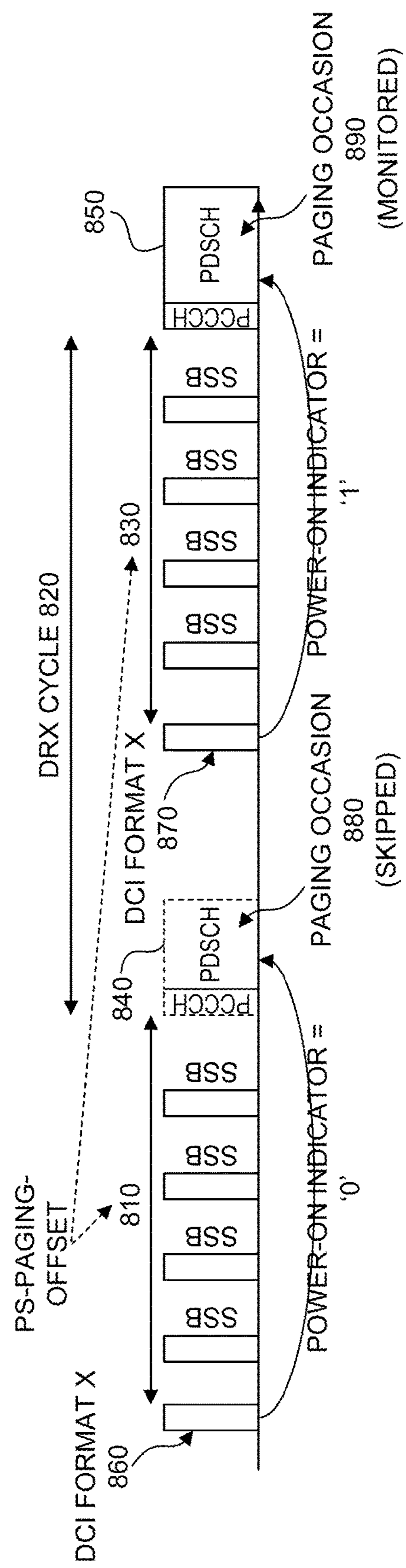
FIG. 8 illustrates one example of paging occasion (PO) PDCCH monitoring based on the indication of DCI format X, in accordance with aspects of the disclosure.

FIG. 8 provides one example of PO PDCCH monitoring based on the indication of DCI format X. Referring to FIG. 8, the UE may not detect DCI Format 860 or detects DCI format X 860 which signals the "Power-On Indication (POI)=0". In accordance with certain embodiments of this disclosure, UE does not monitor the associated PO 880 for receiving PDSCH 840 based on this indication. Therefore, the SSB transmissions in duration 810 may also be omitted at last for PO 880 reception purposes.

In other embodiments, UE may receive DCI Format X 870 with indicator setting as "Power-On Indication (POI)=1" prior to the associated PO 890. Correspondingly, the UE needs to monitor PO 890 with probably using the SSB transmissions in duration 830 prior to the PO transmission for synchronization purpose.

Figure 9:
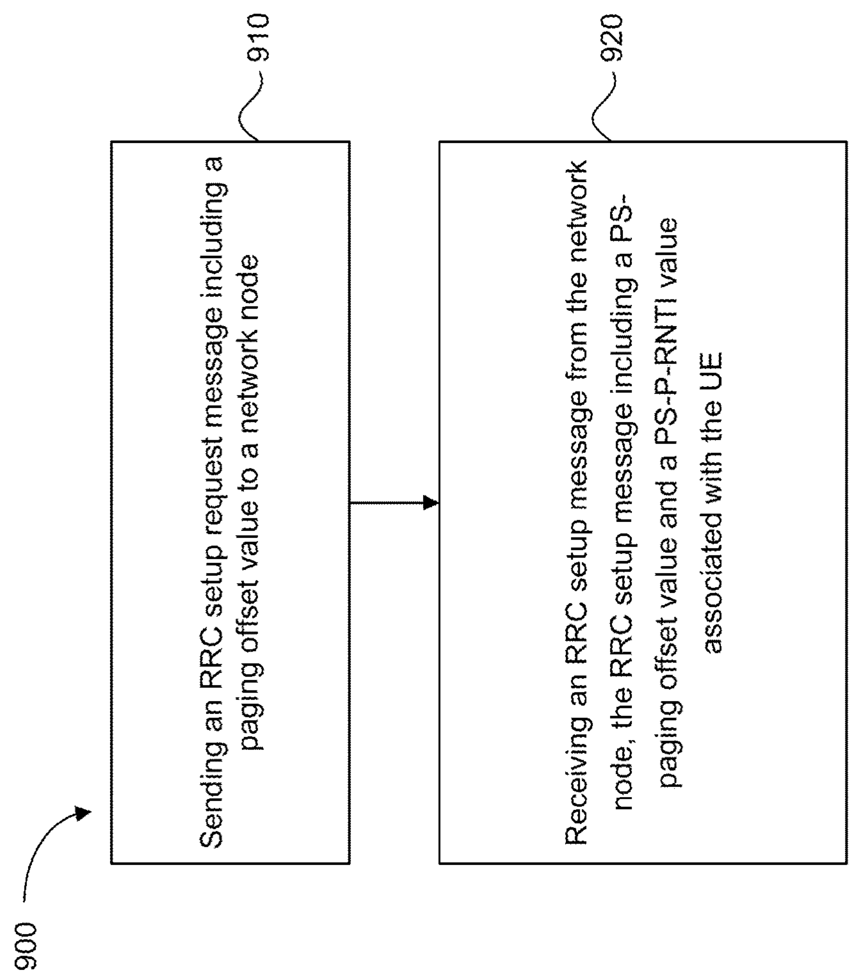
FIG. 9 depicts an example procedure for practicing the various aspects discussed herein.

FIG. 9 illustrates a flowchart diagram of a method 900 for communication by a user equipment (UE) with a network node in a wireless communication system. The method includes the following steps. Step 910 of the method includes the step of sending an RRC setup request message including a paging offset value to a network node. Step 920 of the method includes receiving an RRC setup message from the network node, the RRC setup message including a PS-paging offset value and a PS-P-RNTI value associated with the UE.

Figure 10:
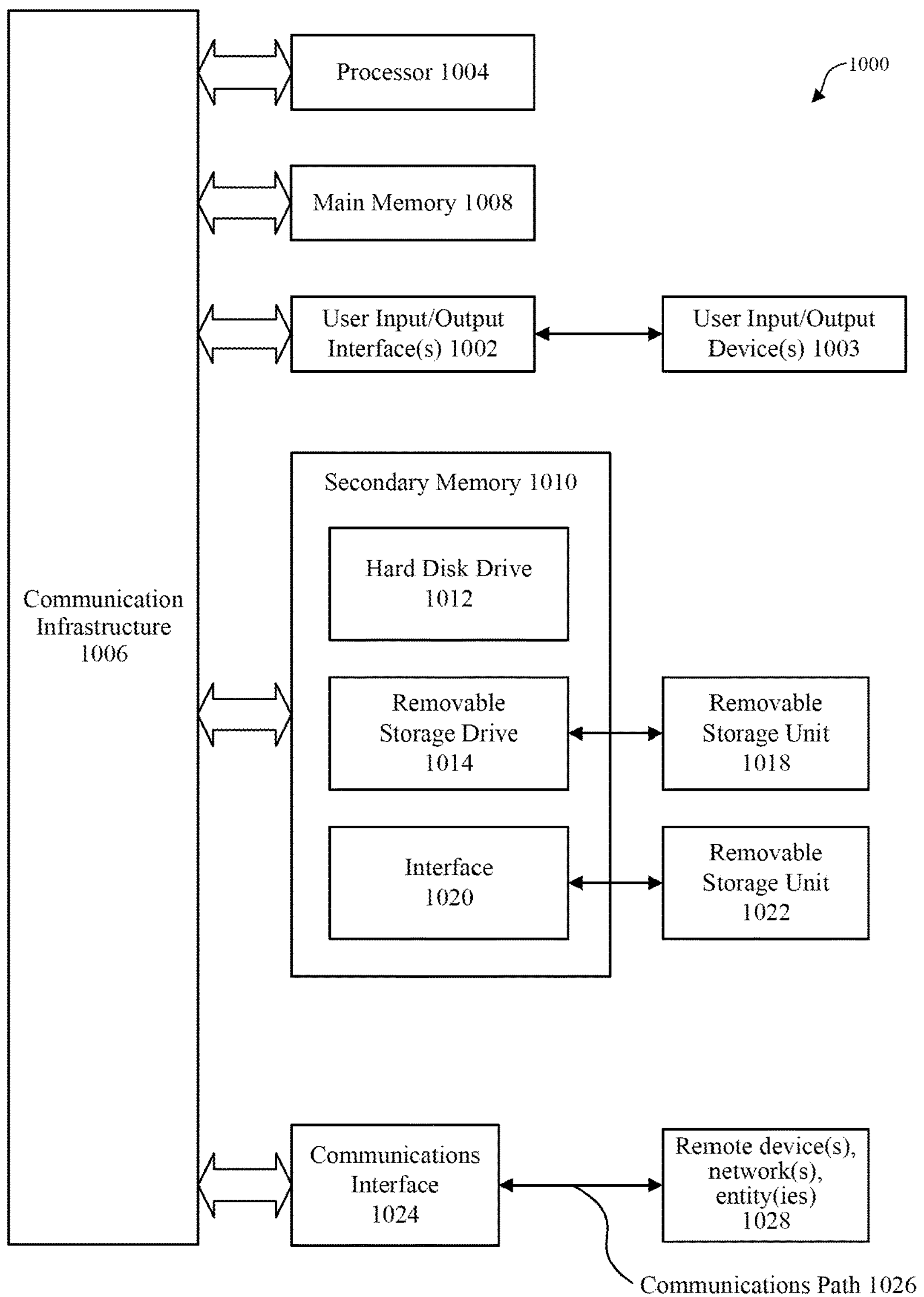
FIG. 10 is an example computer system for implementing some aspects or portion(s) thereof.

Various aspects can be implemented, for example, using one or more computer systems, such as computer system 1000 shown in FIG. 10. Computer system 1000 can be any well-known computer capable of performing the functions described herein. Computer system 1000 includes one or more processors (also called central processing units, or CPUs), such as a processor 1004. Processor 1004 is connected to a communication infrastructure 1006 (e.g., a bus.) Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some aspects, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 10. In particular, aspects may operate with software, hardware, and/or operating system implementations other than those described herein.

EXAMPLES

Example 1 may include a method comprising sending an RRC setup request message including a paging offset value to a network node; and receiving an RRC setup message from the network node, the RRC setup message including a PS-paging offset value and a PS-P-RNTI value associated with the UE.

Example 2 may include the method of example 1 or some other example herein, wherein the paging offset value may be expressed in units of milliseconds.

Example 3 may include the method of example 1 or some other example herein, wherein the paging offset value may be expressed in units of slots.

Example 4 may include the method of example 1 or some other example herein, wherein the paging offset value may be expressed in units of Synchronization Signal Block (SSB) periodicity.

Example 5 may include the method of examples 1 through 4, or some other example herein, wherein the ps-paging-offset value may be configured in the UE, and used for Paging Occasion (PO) monitoring in the RRC_CONNECTED state.

Example 6 may include the method of examples 1 through 4, or some other example herein, wherein the ps-paging-offset value may be configured in the UE, and used for Paging Occasion (PO) monitoring in the RRC_IDLE state.

Example 7 may include the method of examples 1 through 4, or some other example herein, wherein the ps-paging-offset value may be configured in the UE, and used for Paging Occasion (PO) monitoring in the RRC_INACTIVE state.

Example 8 may include the method of examples 1 through 7, or some other example herein, wherein the RRC setup message includes corresponding search space configuration information.

Example 9 may include the method of examples 1 through 7, or some other example herein, wherein the RRC setup message includes an indication of an interval between the PDCCH for paging and the PDSCH for paging.

Example 10 may include the method of examples 1 through 9, or some other example herein, wherein the indication is provided using a predefined table for a particular use case.

Example 11 may include the method of examples 1 through 9, or some other example herein, wherein the indication is provided using a predefined table for a particular use case, where the predefined table is in a protocol specification.

Example 12 may include the method of examples 1 through 9, or some other example herein, wherein the indication is provided using a predefined table for a particular use case, where the use case is based on use of a frequency range (FR).

Example 13 may include the method of examples 1 through 9, or some other example herein, wherein the indication is provided using a set of time-domain resource allocations provided in SIB1 and used for paging PDSCH scheduling.

Example 14 may include the method of examples 1 through 13, or some other example herein, wherein the UE enters a micro-sleep between the PDCCH for paging and the PDSCH for paging, based on an indication of an interval between the PDCCH for paging and the PDSCH for paging.

Example 15 may include the method of examples 1 through 14, or some other example herein, wherein the paging-offset value determined by the UE depends on the number of SSBs that the UE needs to process in order to maintain the time and frequency synchronization for paging PDSCH decoding.

Example 16 may include the method of examples 1 through 15, or some other example herein, wherein the paging-offset value determined by the UE is reported using a set of offset values associated with different SSB-based SS-RSRP thresholds.

Example 17 may include the method of examples 1 through 16, or some other example herein, wherein a new DCI format X is used to notify the UE of power saving information outside the DRX active time period.

Example 18 may include the method of examples 1 through 17, or some other example herein, wherein a new DCI format X is used to notify the UE of power saving information outside the DRX active time period when the UE is in any one of the RRC_IDLE, the RRC_INACTIVE and the RRC_CONNECTED states.

Example 19 may include the method of examples 1 through 18, or some other example herein, wherein a new DCI format X used to notify the UE of power saving information includes using a CRC scrambled by PS-P-RNTI.

Example 20 may include the method of examples 1 through 19, or some other example herein, wherein a new DCI format X used to notify the UE of power saving information includes a Power-On Indication field, which indicates the UE is requested to monitor PDCCH for paging reception.

Example 21 may include the method of examples 1 through 20, or some other example herein, wherein a new DCI format X used to notify the UE of power saving information includes an aperiodic TRS trigger field.

Example 22 may include the method of examples 1 through 21, or some other example herein, wherein the TRS resource sets for the trigger purposes are configured and signaled to the UE in the RRC setup message from the gNB.

Example 23 may include the method of examples 1 through 22, or some other example herein, wherein the aperiodic TRS trigger field includes a "NOT" trigger state to provide flexibility for the gNB to control signaling overhead.

Example 24 may include the method of examples 1 through 23, or some other example herein, wherein the aperiodic TRS trigger field is operative only when the Power-On Indication field is set such that UE is requested to monitor PDCCH for paging reception.

Example 25 may include the method of examples 1 through 24, or some other example herein, wherein a new DCI format X used to notify the UE of power saving information includes a number of skipped DRX cycles for paging monitoring.

Example 26 may include the method of examples 1 through 25, or some other example herein, wherein a new DCI format X used to notify the UE of power saving information includes an indication of the aggregation-level of CCEs for PO PDCCH that issued to schedule paging PDSCH.

Example 27 may include the method of examples 1 through 26, or some other example herein, wherein a new DCI format X used to notify the UE of power saving information is fixed in a protocol specification.

Example 28 may include the method of examples 1 through 27, or some other example herein, wherein a new DCI format X used to notify the UE of power saving information is aligned with a legacy DCI format, such as DCI Format 1_0.

Example 29 may include the method of examples 1 through 28, or some other example herein, wherein a new DCI format X used to notify the UE of power saving information is aligned with a legacy DCI format by re-purposing a reserved field in the legacy DCI format.

Example 30 may include the method of examples 1 through 29, or some other example herein, wherein a new DCI format X used to notify the UE of power saving information includes a field to indicate transmission timing parameter associated with the triggered TRS.

Example 31 may include the method of examples 1 through 30, or some other example herein, wherein a new DCI format X used to notify the UE of power saving information includes a field to indicate transmission timing parameter, wherein the first TRS transmission occasion configured by higher layers that starts no earlier than a processing delay after the last symbol of triggering PDCCH transmission is triggered for reception.

Example 32 may include the method of examples 1 through 31, or some other example herein, wherein the processing delay (related to the T_(pros,x) symbols) after the last symbol of triggering PDCCH transmission is fixed in a protocol specification, e.g., based on a reference SCS.

Example 33 may include the method of examples 1 through 32, or some other example herein, wherein the triggered TRS resource is included in the TRS resource configuration that starts later than the T_(pros,x) symbols.

Example 34 may include the method of examples 1 through 33, or some other example herein, wherein the TRS resource is defined relative to the first symbol of associated PO monitoring PDCCH location.

Example 35 may include an apparatus comprising means to perform one or more elements of a method described in or related to any of examples 1-34, or any other method or process described herein.

Example 36 may include one or more non-transitory computer-readable media comprising instructions to cause an electronic device, upon execution of the instructions by one or more processors of the electronic device, to perform one or more elements of a method described in or related to any of examples 1-34, or any other method or process described herein.

Example 37 may include an apparatus comprising logic, modules, or circuitry to perform one or more elements of a method described in or related to any of examples 1-34, or any other method or process described herein.

Example 38 may include a method, technique, or process as described in or related to any of examples 1-34, or portions or parts thereof.

Example 39 may include an apparatus comprising: one or more processors and one or more computer-readable media comprising instructions that, when executed by the one or more processors, cause the one or more processors to perform the method, techniques, or process as described in or related to any of examples 1-34, or portions thereof.

Example 40 may include a signal as described in or related to any of examples 1-34, or portions or parts thereof.

Example 41 may include a signal in a wireless network as shown and described herein.

Example 42 may include a method of communicating in a wireless network as shown and described herein.

Example 43 may include a system for providing wireless communication as shown and described herein.

Example 44 may include a device for providing wireless communication as shown and described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The invention claimed is:

1. A method for communication by a user equipment (UE) in a wireless communication system, the method comprising:

sending a radio resource control (RRC) setup request message including a paging offset value to a network node; and receiving an RRC setup message from the network node, the RRC setup message including a PS-paging offset value and a PS-Paging-Radio Network Temporary Identifier (PS-P-RNTI) value associated with the UE.

2. The method of claim 1, wherein the RRC setup message further includes a search space configuration indication.

3. The method of claim 2, further comprising:

entering a micro-sleep phase based on the search space configuration indication.

4. The method of claim 1, further comprising:

receiving Downlink Control Information (DCI) information in a block associated with the UE, the DCI information having a paging occasion (PO) indicator field, an aperiodic Channel State Information-Reference Signal (CSI-RS) field, and a skipped Discontinuous Reception (DRX) cycle indicator field.

5. The method of claim 4, wherein a starting position of the block is provided by a higher layer configuration of the UE.

6. The method of claim 4, wherein the DCI information further includes a field indicative of a triggered Tracking Reference Signal (TRS) timing parameter.

7. The method of claim 1, wherein the paging offset value is based on a number of Synchronization Signal Blocks (SSB) needed by the UE to maintain synchronization.

8. A user equipment (UE) for communicating with a network node in a wireless communication system, the UE comprising:

a transceiver configured to transmit data to the network node, and to receive data from the network node; and processor circuitry configured to:

send, using the transceiver, a radio resource control (RRC) setup request message including a paging offset value to the network node; and receive, using the transceiver, an RRC setup message from the network node, the RRC setup message including a PS-paging offset value and a PS-Paging-Radio Network Temporary Identifier (PS-P-RNTI) value associated with the UE.

9. The UE of claim 8, wherein the RRC setup message further includes a search space configuration indication.

10. The UE of claim 9, wherein the processor circuitry is further configured to:

enter a micro-sleep phase based on the search space configuration indication.

11. The UE of claim 8, wherein the processor circuitry is further configured to:

receive Downlink Control Information (DCI) information in a block associated with the UE, the DCI information having a paging occasion (PO) indicator field, an aperiodic Channel State Information-Reference Signal (CSI-RS) field, and a skipped Discontinuous Reception (DRX) cycle indicator field.

12. The UE of claim 11, wherein a starting position of the block is provided by a higher layer configuration of the UE.

13. The UE of claim 11, wherein the DCI information further includes a field indicative of a triggered Tracking Reference Signal (TRS) timing parameter.

14. The UE of claim 8, wherein the paging offset value is based on a number of Synchronization Signal Blocks (SSB) needed by the UE to maintain synchronization.

15. A network node for communicating with a user equipment (UE) in a wireless communication system, the network node comprising:

a transceiver configured to transmit data to the UE, and to receive data from the UE; and processor circuitry configured to:

receive, via the transceiver, a radio resource control (RRC) setup request message including a paging offset value from the UE; and send, via the transceiver, an RRC setup message to the UE, the RRC setup message including a PS-paging offset value and a PS-Paging-Radio Network Temporary Identifier (PS-P-RNTI) value associated with the UE.

16. The network node of claim 15, wherein the RRC setup message further includes a search space configuration indication.

17. The network node of claim 15, wherein the processor circuitry is further configured to:

transmit Downlink Control Information (DCI) information in a block associated with the UE, the DCI information having a paging occasion (PO) indicator field, an aperiodic Channel State Information-Reference Signal (CSI-RS) field, and a skipped Discontinuous Reception (DRX) cycle indicator field.

18. The network node of claim 17, wherein a starting position of the block is provided by a higher layer configuration of the UE.

19. The network node of claim 17, wherein the DCI information further includes a field indicative of a triggered Tracking Reference Signal (TRS) timing parameter.

20. The network node of claim 15, wherein the paging offset value is based on a number of Synchronization Signal Blocks (SSB) needed by the UE to maintain synchronization.

* * * * *